United States Patent [19]

Gicquel

[11] Patent Number: 5,047,452

[45] Date of Patent: Sep. 10, 1991

[54] BINDER AND BINDER-BASED SIZE FOR MINERAL FIBERS

[75] Inventor: Bernard Gicquel, Saint-Brice Sous Foret, France

[73] Assignee: Saint Gobain Recherche, Aubervilliers Cedex, France

[21] Appl. No.: 427,377

[22] Filed: Oct. 27, 1989

[30] Foreign Application Priority Data

Oct. 27, 1988 [FR] France .................... 88 14008

[51] Int. Cl.$^5$ .................... C08L 63/00
[52] U.S. Cl. .................... 523/443; 523/463
[58] Field of Search .................... 523/443, 463

[56] References Cited

U.S. PATENT DOCUMENTS

| | | | |
|---|---|---|---|
| 3,449,281 | 6/1969 | Sullivan | 260/292 |
| 4,075,153 | 2/1978 | Leo | 523/443 |
| 4,246,145 | 1/1981 | Molinier et al. | 523/443 |
| 4,394,418 | 7/1983 | Temple | 523/443 |

OTHER PUBLICATIONS

The Merk Index, 9th ed., 409.

Primary Examiner—Melvyn I. Marquis
Attorney, Agent, or Firm—Oblon, Spivak, McClelland, Maier & Neustadt

[57] ABSTRACT

A size for insulating type glass fibers, comprising an epoxy resin of a glycidyl ether dispersable in water, an amino setting agent having a flash point over 180° C. and, as additives, 0.1 to 2% of silane and 0 to 15% of a mineral oil, each calculated per 100 parts of dry resin.

6 Claims, No Drawings

BINDER AND BINDER-BASED SIZE FOR MINERAL FIBERS

BACKGROUND OF THE INVENTION

1. Field of the Invention

The invention relates to the use of a thermosetting synthetic resin in the production of products based on mineral fibers, in particular glass fibers such as mineral fiber mats which are employed in the manufacture of thermal insulation and/or in the soundproofing of buildings.

2. Description of the Background

Most mineral-fiber based insulating materials employ a binder for the fibers which ensures the mechanical strength of the material, i.e., it binds the fibers together. The binder must be dispersed homogeneously among the fibers in order to avoid forming bundles of fibers surrounded by lumps of binder within a group of more brittle and therefore dustier fibers. The binder is always used in a diluted state in a size.

It is known to use a thermosetting phenolic molding resin (phenol-formaldehyde) or an amino-aldehydic resins (melamine-formaldehyde or urea-formaldehyde) resin as a binder. The most frequently used binders are resols which are the products of the condensation in the presence of alkaline or alkaline-earth catalysts, of phenols, having open ortho- and para-sites, and aldehydes, primarily formaldehyde. These resins form a size which, in addition to water, contains urea which serves to reduce the free formaldehyde content and also acts as a binder, along with various additives such as oil, ammonia, coloring agents and, if necessary, fillers.

There are very many criteria, and of different types, involved in the selection of a binder, without forgetting however that a binder must above all adhere correctly to the glass.

First, it is essential that the binder be rheologically compatible with the fiber manufacturing process. Without going into unnecessary details, the glass fibers are usually produced using a centrifuge with a vertically oriented axis into which a continual jet of molten glass is introduced. The glass is sprayed towards the peripheral wall of the centrifuge from which it escapes in the form of filaments through a multitude of tiny orifices. The filaments produced are drawn out and pulled downwards by a high temperature high pressure gas current. The fibers obtained are collected on a gas permeable conveyor and thus form a mat of varying thickness depending on the speed of the conveyor.

The size should ideally coat each fiber produced in this way perfectly. It is therefore preferable to spray the size compound onto the fibers while the fibers are still separate, i.e., before the mat is formed. Consequently, the size is sprayed into the fiber reception hood, below the burners which generate the gas current to draw out the fibers. As a corollary to this operation it is forbidden to use inflammable organic solvents and/or pollutants in formulating the size, since the risk of fire and/or pollution in the reception hood is too high. In addition, the resin serving as binder must not polymerize too rapidly before taking on the desired shape.

Furthermore, although this polymerization should not be too rapid, it should not take too long. However, on this point, resins currently in use are not perfectly satisfactory since complete polymerization is achieved in a time compatible with a high production rate only after remaining in a high temperature over at approximately 250° C. which is a high power consumer.

Lastly, the resin and its implementation process must be of relatively moderate cost which is compatible with that of glass fiber manufacture and must not lead either directly or indirectly to the formation of toxic or polluting effluents. In this respect, a choice by an industrial concern has been to select resins which do not require the use of formaldehyde in their manufacture, and which in addition do not release significant quantities of formaldehyde when they decompose under the effects of great heat. In such conditions, the product is, of course, non-toxic and in addition does not give off an unpleasant odor if it should burn.

In an industry associated with the insulating glass fiber industry, i.e., the reinforcement glass fiber industry, it is known to sheath glass fibers with an epoxy resin. The sizing operation has the double object of protecting the fibers individually so that they are thus less sensitive to friction and offer better bonding to the plastic material for which the fibers act as reinforcement. But in this case, there is no attempt to link the glass fibers and nothing allowed concluding that glass/glass bonding was sufficiently solid for good mechanical resistance and localized throughout the total thickness.

SUMMARY OF THE INVENTION

Accordingly, one object of the present invention is to provide a size for insulating fibers.

Another object is to provide a method by which insulating glass fibers may be treated with a sizing agent.

Briefly, these objects and other objects of the present invention as hereinafter will become more readily apparent can be attained by a sizing agent for insulating glass fibers which is an epoxy resin of a glycidyl ether dispersed in water, an amino hardening agent having a flash point over 180° C., and, as additives, 0.1 to 2% silane and 0 to 15% of a mineral oil, each calculated on 100 parts of dry resin.

DETAILED DESCRIPTION OF THE PREFERRED EMBODIMENTS

By being placed in an aqueous medium is meant a resin directly dispersable in water or likely to be emulsified with or without the addition of an emulsifying agent.

Suitable epoxy resins for use in the invention have a mean polymerization index n from 0 to 1 inclusive and preferably under 0.2, n being equal to the mean number of supplementary bisphenol A groups per glycidylic ether molecule obtained by condensation of epichlorhydrin

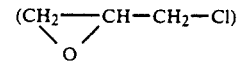

and of bisphenol A $(HO-C_6H_4-C(CH_3)_2-C_6H_4-OH)$, the condensation reaction being carried out in strictly stoichiometric conditions (2 moles of epichlorhydrin per one mole of bisphenol A) giving a glycidylic ether of index $n=0$. Resins with a low polymerization index, and therefore shorter chains, usefully form a denser reticulated network which one finds leads experimentally to products of higher mechanical strength. However, an epoxy resin of index $n=0$ is not preferred since it tends to crystallize during storage and is much more difficult to synthesize since it is purer and thus more costly.

By non-volatile amino setting agent is meant a setting agent having a flash point over 180° C. Indeed, under these conditions, no self-igniting is observed in the fiber reception hood where the binder is sprayed.

Suitable amino hardening agents include primary, secondary, aliphatic, alicyclic, aromatic and araliphatic polyamines and polyaminoamides. The NH equivalent molar mass, i.e., the quantity of product necessary to obtain the equivalent of one amino-hydrogen link per mole, is chosen preferably at under 100 g which corresponds to a high number of reactive sites per molecule.

Furthermore, one can use a catalytic agent for example of the tertiary amino type.

The polymerization index and NH equivalent molar mass are two fairly symmetrical conditions and it is possible to compensate, at least to an extent, for a fairly poor polymerization index by using a setting agent of suitable NH equivalent molar mass and vice versa.

The hardening agents belonging to the group of polyacids and acid anhydrides are, in general, excluded from the sphere of the present invention, because of their very low solubility in water (a phenomenon which poses considerable implementation problems) and because of their corrosive nature made worse by their high cost. Phenolic and aminoplastic resins, which release formaldehyde when baked, and hardening agents of the urea, melamine, and quanamide type, which have a low degree of solubility and entail the use of an accelerator, are also excluded.

On the other hand, suitable hardening agents include those of the polyamide and amino-polyamide type. The conditions for use of these moderately-priced products, which do not release formaldehyde when baked, are obtained with relative simplicity. However, this type of hardening agent has the disadvantage that it produces a reaction at relatively low temperatures, thus entailing risk of pregellation. Furthermore, some are corrosive and, when heated, release large quantities of amino compounds, thus causing a danger of pollution. These disadvantages are not exhibited in hardening agents of the dicyanodiamide (DCN) type, which are inexpensive, non-toxic, non-volatile and noncorrosive, have a low degree of solubility in water, and, above all, react almost always only when heated. An impregnated cake may be kept for nearly one year without giving evidence of solidification of the resin.

The resin sprayed onto the fibers must not harden before the mat is formed that is to say, prehardening of the resin should be nominal. It has been found that this condition is satisfied if the epoxy resin hardening time is over 25 minutes at 100° C., the gelling time being, by definition, the time needed at a given temperature for a certain quantity of resin to attain a viscosity set at 3000 centipoises. With the usual phenoplastic resins, a hardening time of 25 minutes is judged insufficient. Resins are preferred which have a gelling time of over 1 hour which is highly limiting. With epoxy resins, much shorter hardening times are possible, surprisingly, if necessary using more dilute resins. It seems, indeed, that phenoplastic epoxy resin/water systems are less stable in the oven than phenoplastic resin/water systems which enables elimination of the water more easily.

In this invention, formaldehyde is not required to prepare the size and further a significant amount of formaldehyde is not driven off in the oven. In addition, complete polymerization can be carried out at a temperature under 220° C. which reduces the risk of producing pollutant products in the oven which require later elimination, by pyrolysis in particular. Other characteristics of the invention are described in detail below referring to comparative tests carried out on three resins A, B, C which satisfy the following formulations:

RESIN A Formaldehyde-phenolic resin (standard resin) Dry part: 55% (by weight) of formaldehyde resin, whose phenol/formaldehyde ratio is equal to 3.2, with mineral catalysis less than 20 mPa of viscosity at 20° C.–and 45% of urea.

RESIN B Bi-compound epoxy resin based on diglycidylether of bisphenol A (Europox 756, trademark of the SCHERRING company; epoxy index 0.54, 0.02 (epoxy mole for 100 g); epoxy equivalent 178–192 (g/mole); mean polymerization index n=0.1.

RESIN C Bi-compound epoxy resin Noxyl 865, trademark of the SAVID company, epoxy index 0.33 (epoxy mole for 100 g); epoxy equivalent 300 g/mole, mean polymerization index n=0.91.

HARDENING

AGENT D Water-based polyamine, Euredur 36, patented trademark of the SCHERRING company; flash point 190° C., dry extract 80%, NH equivalent mass 132 g (i.e., one NH active group for 132 g of dry product).

HARDENING

AGENT E Aliphatic polyamide XIONEL SP 3288 trademark of the SAVID company; NH equivalent mass 57 g.

HARDENING

AGENT F Dicyanodiamide having a NH equivalent mass of 21 g in association with a polymerization accelerator, preferably of the tertiary amino type (for example tridimethylaminoethyl phenol)

Unless otherwise stipulated, the resins are mixed with the setting agents in a ratio (by weight) of one NH group for one epoxy equivalent group.

VISCOMETRIC BEHAVIOR

The size must have good rheological compatibility with the fiber manufacturing process. In particular, one must avoid hardening of resin occurring in the fiber reception hood before the mat is formed in order to avoid forming nonhomogeneous fibrous masses.

To estimate the viscosimetric behavior in a container thermostatically controlled at 100° C., 10 g of resin is placed in a 30% solution in de-ionized water. A viscosimetric probe is immersed in the container and the time taken for the viscosity to reach 3000 centipoises is measured.

Test n° 1 (resin A) : 60′
Test n° 2 (resin B+setting agent D) : 27′
Test n° 3 (resin B+setting agent F) ; 49′

The gelling times obtained during tests 2 and 3 are thus much shorter than for test n° 1. However, one notes, surprisingly, that this has no significant effect, on line, on condition that the quantities of water used are increased, if necessary.

ON LINE TEST

For the invention, the size should be sprayed onto the so-called insulating glass fibers, i.e., fibers obtained by an aerodynamic process of drawing out of fibers with a high pressure high temperature gas current, as opposed to so-called textile fibers obtained by mechanical drawing out of filaments produced by a spinning machine. The size is particularly suited to fibers obtained according to the TEL process, molten glass being introduced inside the centrifuge plate revolving at high speed from which it escapes in the form of filaments through a series of orifices practiced on the plate wall, the filaments being drawn out in the form of fibers by a high speed high temperature gas current generated by the burners surrounding the plate. The size is sprayed onto the fibers before they are collected by a reception device. The sizes are prepared by dispersion of the resin in a quantity of water calculated to bring the proportion of dry extract to 10%, then by adding a silane. For the standard resin of the examples of the present disclosure 3 parts of ammonia were added to 100 parts of phenol-formaldehyde resin in compliance with standard practice.

We initially carried out the different tests on a laboratory line producing glass fibers at a draw out rate of 12 kg/hour. The characteristics of the fiber producing unit comply with the teachings of French Patent 2 223 318 and the fibers produced thus are comparable to those obtained industrially. In the fiber-producing hood, a size is sprayed onto the fibers with 2% of resin in deionized water. Squares were obtained having sides of 450 mm and a thickness of 50 mm, said squares having a binder content of approximately 5% after polymerization.

TENSILE STRENGTH

The tensile strength (or "TS" given in gf/g) is measured on test samples in the form of rings drawn out by two interior rods in compliance with standard ASTM C 686-71T. The results of these measurements are indicated in TABLE I. Aging is simulated by passing the test sample through an autoclave for 30 minutes at 107° C., under autogenous water pressure.

TABLE I

| Tests | 4 | 5 | 6 |
|---|---|---|---|
| Resin of type | A | B | B |
| Hardening agent of type | — | D | F |
| TS after preparation (in gf/g) | 600 | 740 | 750 |
| TS after aging (in gf/g) | 525 | 400 | 470 |
| Percentage of binder in finished product | 5% | 6% | 5.8% |

According to the invention the mechanical strengths after aging are slightly less with resins. However, they remain satisfactory. The influence of the epoxy resin polymerization index n and of the amino hardening agent NH equivalent molar mass is exemplified by the following tests (carried out with 0.5% of silane added systematically).

The resin formulations used for tests 7 to 10 of TABLE II (TS in g/f) are as follows:
Test n° 7 : resin B+hardening agent D,
Test n° 8 : resin C+hardening agent E,
Test n° 9 : resin C+hardening agent D,
Test n° 10: resin B+hardening agent E.

TABLE II

| Test n° | 7 | 8 | 9 | 10 |
|---|---|---|---|---|
| TS after preparation | 650 | 617 | 432 | 697 |
| TS after aging | 528 | 526 | 326 | 574 |
| % of binder | 4.6 | 4.65 | 4.3 | 4.0 |

Tests 5, 7 and 10 carried out with the resin having the smallest polymerization index give the best results after aging. Test 8 (and also test 6) indicate that a setting agent whose NH equivalent molar mass is highly associated with a resin with a high polymerization index leads to products initially very correct, but whose mechanical strengths deteriorate greatly.

The poorest results are obtained with test 9 which corresponds to an epoxy resin having a high polymerization index and a hardening agent with a high NH equivalent molar mass.

The product preferred for the invention (test 10) exhibits excellent behavior after preparation and after aging. In addition, an adequate quantity of silane enables optimization of the properties as shown in Tests 11 to 14 in TABLE III established by varying the quantity of silane in the different samples prepared from a type B resin and a setting agent type D.

TABLE III

| Test | Silane % | Binder % | TS after preparation | TS after autoclave |
|---|---|---|---|---|
| 11 | 0 | 6.6 | 707 | 258 |
| 12 | 0.5 | 5.6 | 724 | 392 |
| 13 | 1.0 | 5.8 | 692 | 395 |
| 14 | 1.5 | 6.5 | 712 | 422 |

The main effect of adding silane is the improvement of product aging, whereas at a nearby binder rate the tensile strength (given here in gf/g) measured immediately after product preparation is practically constant. The best results are obtained for a percentage of silane between 0.5 and 1% inclusive. In the case of insulating fiber materials, it therefore appears that the silane acts essentially by forbidding the insertion of water molecules between the glass and the resin and not as a promoter of glass/resin bonding.

With regard to the influence of the ratio of epoxy resin to its hardening agent, a type B resin and type D hardening agent, were used to which was added 0.5% of silane in compliance with experience gained from the previous tests. The results are summarized in Table IV below.

TABLE IV

| Test n° | Resin B % | Hardening agent D % | Binder % | TS | TS autoclave |
|---|---|---|---|---|---|
| 15 | 45 | 55 | 6.2 | 653 | 336 |
| 16 | 53 | 47 | 6.3 | 741 | 400 |
| 17 | 58 | 42 | 5.4 | 723 | 346 |
| 18 | 63 | 37 | 6.2 | 686 | 388 |
| 19 | 70 | 30 | 5.2 | 653 | 316 |

The best results (for an identical binder rate) are obtained when the ratio of the number of epoxy resin groups to the number of setting agent NH equivalent groups is close to the stoichiometric ratio, i.e., 53/43 by mass for the resins of tests 15 to 19.

These first results were then checked by preparing 9 samples including two reference samples based on a standard resin. These samples were obtained on a pilot production line under conditions very close to industrial conditions. In this line, the glass fibers are prepared according to the so-called "TEL" process as explained in EP patent 91,866. Production of drawn-out glass is 20 tons per day. The sizes are delivered by a dosing pump with a quantity of de-ionized water enabling the proportion of dry extract to be brought to 10%. A silane was employed as an additive and an anti-dusting agent and a softener, from 0 to 10% of mineral oil. One can also use other types of oil such as linseed oil, soybean oil, safflower oil fatty acid, fish oil or Chinese wood oil or a non-drying oil such as coconut oil, palm oil or stearic acid. The sizes are sprayed into the fiber collection hood at an air pressure of 1.5 bar. A certain quantity of excess water, referred to as an overspray, is sprayed onto the fiber collection at the same time to bring the proportion of dry extract in relation to the final quantity of water to a value of between 5 to 8% inclusive and preferably between 6.5 and 7.5%. In compliance with the data obtained from viscosimetric measurements, tests with the resin according to the invention were carried out with a quantity of excess water of more than 50% more than that used for a standard size.

Polymerization is carried out in a ventilated oven in which the glass fiber mat penetrates between two squeeze rollers which impose upon it a given thickness, greater than rated thickness, i.e., the minimum thickness guaranteed to the user.

Here below details are given of the preparative conditions of the different samples, the rate of binder measured after polymerization and dimensional characteristics (gms substance, density, actual product thickness).

Sample n° 20

Size formulation:
  phenol/formaldehyde control resin

| type A | 100 parts |
|---|---|
| % of silane | 1 part |
| % of oil | 10 parts |
| % of liquid ammonia | 3 parts |

Flow rate:
  size (kg/h) :540
  overspray (kg/h): 200
Temperature of product in oven:250° C.
Percentage of binder in finished product:5.04
Gsm substance (g/m$^2$):878
Density (kg/m$^3$):10.97
Thickness (mm):129.2

Sample n° 21

Size formulation:
  Resin B, hardening agent D in the ratio:55/45
  % of silane 0.5
Flow rate:
  size (kg/h):640
  overspray (kg/h):300
Temperature of product in oven:250° C.
Percentage of binder in finished product:5.88
Gsm substance (g/hu2):899
Density (kg/m$^3$):11.24
Thickness (mm):129.3

Sample n° 22

Size formulation:
  Resin B, hardening agent D in the ratio:55/45
  % of silane: 0.5
Flow rate:
  size (kg/h):840
  overspray (kg/h):300
Temperature of product in oven:250° C.
Percentage of binder in finished product:5.06
Gsm substance (g/m$^2$):892
Density (kg/m$^3$):11.15
Thickness (mm):128.7

Sample n° 23

Size formulation:
  Resin B, hardening agent D in the ratio:55/45
  % of silane: 0.5
Flow rate:
  size (kg/h):840
  overspray (kg/h):300
Temperature of product in oven:250° C.
Percentage of binder in finished product:5.12
Gsm substance (g/m$^2$):897
Density (kg/m$^3$):11.21
Thickness (mm):129.6

Sample n° 24

Size formulation:
  phenol-formaldehyde control resin
  type A:100 parts
  % of silane: 1 part
  % of oil: 10 parts
  % of liquid ammonia: 3 parts
Flow rate:
  size (kg/h):540
  overspray (kg/h):200
Temperature of product in oven:218° C.
Percentage of binder in finished product:4.5
Gsm substance (g/m2):916
Density (kg/m3):11.4
Thickness (mm):129.5

Sample n° 25

Size formulation:
  Resin B, hardening agent D in the ratio:55/45
  % of silane:0.5
Flow rate:
  size (kg/h):840
  overspray (kg/h):300
Temperature of product in oven: 216° C.
Percentage of binder in finished product:5.8
Gsm substance (kg/m2):916
Density (kg/m3):12.0
Thickness (mm):129.1

Sample n° 26

Size formulation:
  Resin B, hardening agent D in the ratio:55/45
  % of silane 0.5
  % of oil 9.5
Flow rate:
  size (kg/h):840
  overspray (kg/h):300
Temperature of product in oven:218° C.
Percentage of binder in finished product:6.5
Gsm substance (g/m2):908
Density (kg/m3):11.3
Thickness (mm):128.2

Sample n° 27

Size formulation:
  Resin B, hardening agent D in the ratio:55/45
  % of silane 0.5

% of oil 9.5
Flow rate:
  size (kg/h):840
  overspray (kg/h):300
Temperature of product in oven:200° C.
Percentage of binder in finished product:6.2
Gsm substance (g/m2):898
Density (kg/m3):11.2
Thickness (mm):129.0

Sample n° 28

Size formulation:
  Resin B, hardening agent D in the ratio : 50/50
  % of silane 0.5
  % of oil 9.5
Flow rate:
  size (kg/h) : 840
  overspray (kg/h) : 300
Temperature of product in oven : 193° C.
Percentage of binder in finished product : 6.0
Gsm substance (g/m2) : 911
Density (kg/m$^3$): 11.4
Thickness (mm) : 131.3
  Sample no. 29
Size formulation:
  Resin C, hardening agent E in the ratio : 84/16
  % of silane 0.5
Flow rate:
  size (kg/h) : 840
  overspray (kg/h) : 300
Temperature of product in oven : 240° C.
Percentage of binder in finished product : 5.95
Gsm substance (g/m$^2$) : 920
Density (kg/m$^3$) : 11.5
Thickness (mm) : 127.9
  Sample no. 30
Size formulation:
  Resin C, hardening agent E in the ratio : 84/16
  % of silane : 0.5
Flow rate:
  size (kg/h):740
  overspray (kg/h) : 200
Temperature of product in oven : 240° C.
Percentage of binder in finished product:6.15
Gsm substance (g/m$^2$): 899
Density (kg/m$^3$) : 11.23
Thickness (mm) : 127.5

The size of the present invention, therefore, enables the preparation of products which hardly differ from standard products from the point of view of their dimensional characteristics (density and thickness) and this without important modification of the manufacturing process.

Samples 20 and 24 obtained with a standard size are yellow in the absence of specific coloring additives. Samples 21, 22 and 23 are very slightly brown. However, samples 25 to 28 are of white color. It is therefore advantageous to maintain the temperature of the product in the oven at approximately 220° C., which enables a good polymerization of the binder. In addition, the final color of the product can be chosen exactly as discussed. Further, there is a diminished risk of evolving pollutants if the oven temperature is low.

For its packaging, on removal from the oven, the product is compressed at a compression rate equal by definition to the ratio of rated thickness to thickness under compression. The samples were tested for compression rates equal to 4 or 6. To evaluate the dimensional resistance of a sample, the thickness after unwrapping, calculated as a percentage of rated thickness, is indicated. This percentage, referred to as thickness recovery, can therefore sometimes exceed 100.

Thickness recovery 24 hours after manufacture for a compression rate of 6 (and 4, respectively)

Sample no. 21:125.8 (133.9)
Sample no. 22:126.0 (135.1)
Sample no. 23:104.7 (119.7)
Sample no. 24:143.1
Sample no. 25:127.5
Sample no. 26:129.4
Sample no. 27:129.2
Sample no. 28:131.7
Sample no. 29:141.8 (137.2)
Sample no. 30:143.7 (136.4)

Thickness recovery 12 days after manufacture for a compression rate of 6 (and 4, respectively)

Sample no. 20:135.8 (140.7)
Sample no. 21:110.7 (124.6)
Sample no. 23:113.3 (122.7)
Sample no. 23:105.3 (106.6)
Sample no. 29:137.0 (133.6)
Sample no. 30:143.7 (132.5)

The mechanical strength of the products was then tested immediately after preparation of the samples, after 24 hours and then 12 days later, lastly, an artificial aging test was also conducted in the autoclave (Table V).

TABLE V

| No. | Tensile Strength (in gf/g) after | | | |
|---|---|---|---|---|
| | preparation | 24 hours | 12 days | autoclave |
| 20 | 292 | | 257 | 177 |
| 21 | 293 | 279 | 251 | .146 |
| 22 | 273 | 281 | 266 | 210 |
| 23 | 295 | | 272 | 241 |
| 24 | 284 | 264 | | 174 |
| 25 | 257 | 260 | | 186 |
| 26 | 248 | 248 | | 222 |
| 27 | 253 | 241 | | 165 |
| 28 | 268 | 262 | | 197 |
| 29 | 269 | 232 | 217 | 207 |
| 30 | 264 | 247 | 232 | 185 |

The products of the present invention have, after preparation, a tensile strength close to that of standard products, however they are slightly better.

These tests demonstrate the possibility of producing glass fiber products intended in particular for thermal insulation and/or the soundproofing of buildings, particularly light products, replacing standard size with the size according to the invention, and this without modification of the glass fiber production line operating parameters, except as regards the temperature of the oven whose hardening point is reduced by about 30 to 50° C., which saves energy.

These additional tests were undertaken, so as to verify the feasibility of a glue containing an F-type (dicyanodiamide) hardening agent, to which an accelerator of the 2, 4, 6 tri(dimethylaminomethyl) phenol type is joined. This product is marketed under the trademark DMP-30 by ROHM and HAAS FRANCE. (French companies).

These three tests were run on the industrial line previously described (drawn from 20-ton glass per day, without overspray). The following glue formulations were used:

SAMPLE NO. 31
Glue formulation:

| | | |
|---|---|---|
| * control Type A resin | 100 | parts |
| * silane | 0.3 | part |
| * oil | 9.5 | parts |
| * liquid ammonia | 6 | parts |
| * ammonium sulfate | 3 | parts |

SAMPLE NO. 32
Glue formulation:

| | | |
|---|---|---|
| * resin B | 72 | parts |
| * hardening agent E | 28 | parts |
| * silane | 0.5 | part |
| * oil | 12 | parts |

SAMPLE NO. 33
Glue formulation:

| | | |
|---|---|---|
| * resin B | 88 | parts |
| * hardening agent F | 12 | parts |
| * accelerator | 1.2 | part |
| * silane | 0.5 | part |
| * oil | 12 | parts |

| Trial | Micronaire | Grams per square meter | Density | Thickness |
|---|---|---|---|---|
| 31 | 3.35 | 896 | 11.2 | 125.6 |
| 32 | 3.50 | 899 | 11.2 | 128.1 |
| 33 | 3.60 | 927 | 11.6 | 158.5 |

| | Tensile Strength (in gf/g)/ Recovery of thickness (in %) | | | |
|---|---|---|---|---|
| Trial | 24 hours | 12 days | 30 days | 90 days |
| 31 | 300/141.8 | 272/137.5 | 282/138.1 | 227/130.8 |
| 32 | 218/140.7 | 224/136.4 | 238/137.0 | 260/131.3 |
| 33 | 232/141.2 | 223/140.1 | 248/138.5 | 217/137.0 |

The DCN-based hardening agent is satisfactory from all points of view. Recovery of thickness is, in fact, equal to that observed for the standard product after manufacture and is even better after aging. Tensile strength is, on the other hand, somewhat weaker after aging, but remains nevertheless at a high value. It should be noted, furthermore, that, when comparing tests 32 and 33, hardening agents E and F produce very similar results, but at a cost price divided by two for glues containing hardening agent F, which is, in fact, unquestionably the preferred product according to the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a size for the preparation of insulating glass mats consisting essentially of an epoxy resin, an amino hardening agent and, as additives, 0.1 to 20% of silane, 0 to 15% of a mineral oil, the improvement wherein said epoxy resin is a condensation product of epichlorohydrin and bisphenol A having a polymerization index n of less than 1 and the equivalent molar mass of the hardening agent is less than 100 g.

2. The size according to claim 1, wherein said polymerization index is less than 0.2.

3. The size according to claim 1, wherein the polymerization index n is greater than 0.

4. The size according to claim 1, wherein the hardening agent is added to the epoxy resin at a ratio of the number of epoxy resin groups to the number of hardening agent NH equivalent groups virtually identical to the stoichiometric ratio.

5. The size according to claim 1, wherein the resin hardening agent couple presents a hardening time exceeding 25 minutes.

6. The size according to claim 1, wherein the hardening agent is dicyanodiamide.

* * * * *